G. D. ROWELL.
Wheel for Harvester.

No. 160,546. Patented March 9, 1875.

WITNESSES —
Chas. Fink
N. C. Koch

— INVENTOR —
Guilford D. Rowell

UNITED STATES PATENT OFFICE.

GUILFORD D. ROWELL, OF APPLETON, WISCONSIN, ASSIGNOR TO ROWEL & MORRIS, OF SAME PLACE.

IMPROVEMENT IN WHEELS FOR HARVESTERS.

Specification forming part of Letters Patent No. 160,546, dated March 9, 1875; application filed January 16, 1875.

*To all whom it may concern:*

Be it known that I, GUILFORD D. ROWELL, of Appleton, in the county of Outagamie, in the State of Wisconsin, have invented certain Improvements in Hubs and Axle-Trees, of which the following is a specification:

My invention has for its object the improvement of seeders and other agricultural implements, and is accomplished by the application of a thimble-skein, with a hub slipping on over same, and secured in its place by a stem passing through the skein, with a cog-wheel on end of it, and a square collar fitting onto the other end of the stem, which end is made square for the fitting on of the collar, and a square recess in the end of the hub, into which the collar fits, and a nut screwed onto the end of the stem outside of the collar.

Figure 1:
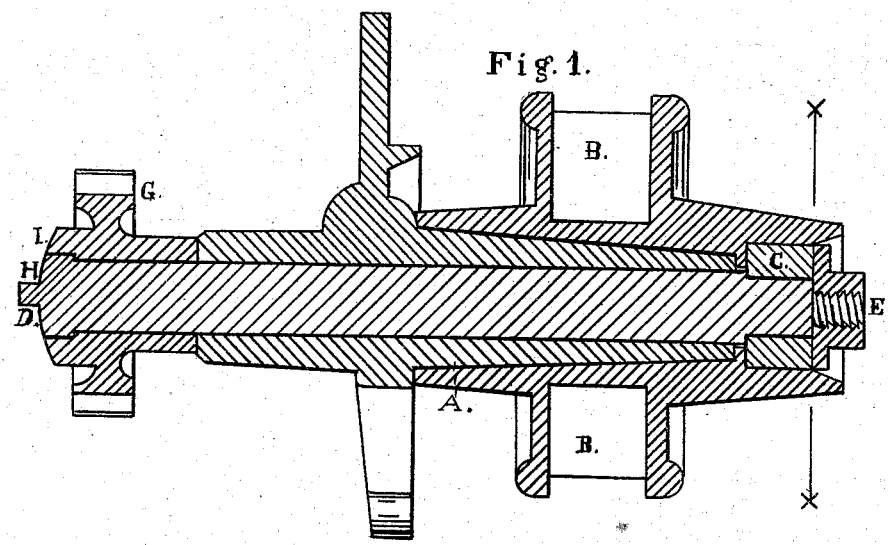
Figure 2:
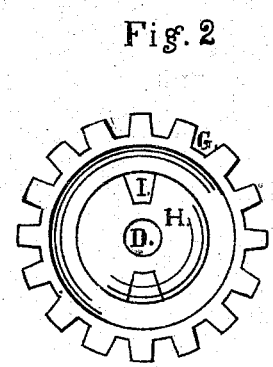
Figure 3:
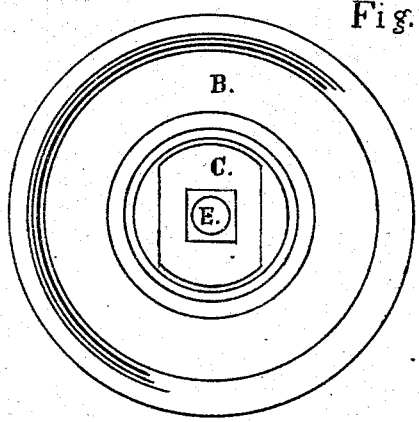

Figure 1 is a sectional view of my invention. Fig. 2 is a view of the cog-wheel; and Fig. 3, a sectional view of the end of the stem and hub for the ground-wheel in line $x\ x$, Fig. 1.

A is the thimble-skein; B, the hub for the ground-wheel, fitting on over same; C, the collar on the end of the stem; D, the stem running through the thimble-skein. This stem is made as follows: A rod of wrought-iron the proper length is set in the sand for a core, and then the cast-iron run in around it, which, sticking to it, forms the stem, and also chills the same. G, the cog-wheel for running the seed-works of the seeder; H, a head on the stem which holds the cog-wheel on; I, lugs in the head, which, fitting into recesses in the cog-wheel, revolve it, this stem being revolved by the hub fitting onto collar C. This thimble-skein is secured to the seeder in any way thought best.

I claim as my invention—

1. Thimble-skein A, hub B, collar C, stem D, and nut E, all in combination, substantially as described.

2. Thimble-skein A, stem D, with its head H, lugs I, and cog-wheel G, all combined substantially as specified.

GUILFORD D. ROWELL.

Witnesses:
W. J. ALLEN,
GEO. C. DICKINSON.